United States Patent [19]

Gölitz, deceased et al.

[11] 3,927,042

[45] Dec. 16, 1975

[54] ALKOXYSILYL-SUBSTITUTED EPOXIDIZED UREA DERIVATIVES

[75] Inventors: Hans Dietrich Gölitz, deceased, late of Cologne, Germany, by Ingrid Irene Klärchen Gölitz, heiress; Kuno Wagner, Leverkusen, Germany; Bernd Quiring, Leverkusen, Germany; Walter Noll, Opladen, Germany

[73] Assignee: Bayer Aktiengesellschaft, Leverkusen, Germany

[22] Filed: May 29, 1973

[21] Appl. No.: 364,776

Related U.S. Application Data

[63] Continuation-in-part of Ser. No. 164,910, July 21, 1971, abandoned.

[30] Foreign Application Priority Data

July 29, 1970 Germany............................ 2037617

[52] U.S. Cl... 260/348 SC; 260/348 A; 260/46.5 E; 117/54; 106/287 SB
[51] Int. Cl.[2]........................................ C07D 303/46
[58] Field of Search.............................. 260/348 SA

[56]     References Cited
    FOREIGN PATENTS OR APPLICATIONS
1,905,100    8/1970    Germany
2,036,717    2/1972    Germany Primary Examiner—Norma S. Milestone
Attorney, Agent, or Firm—Burgess, Dinklage & Sprung

[57]  ABSTRACT

New carbofunctional organosilanes which may be regarded as alkoxysilyl- and glycidyl ether-substituted carbamate-modified urea derivatives having the formula

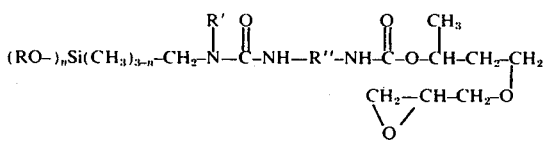

are obtained by reacting an aminomethyl-alkoxysilane of the formula

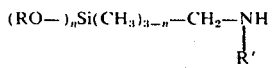

with an epoxy-organo-isocyanate of the formula

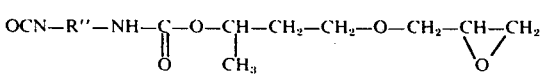

at a temperature below 50°C. In these formulae R is alkyl; R' is alkyl, cyclohexyl or phenyl; R'' is alkylene or cycloalkylene; n is 1, 2 or 3.

The products are utilizable for priming silicious surfaces and for cross-linking convertible organopolysiloxanes.

3 Claims, No Drawings

ALKOXYSILYL-SUBSTITUTED EPOXIDIZED UREA DERIVATIVES

This application is a continuation-in-part of our copending application Ser. No. 164,910, filed July 21, 1971, now abandoned, and assigned to the same assignee as the present invention.

The present invention relates to novel carbofunctional organosilanes which, in particular, may be regarded as alkoxysilyl- and glycidyl ether-substituted carbamate-modified urea derivatives, and which according to the invention correspond to the general formula

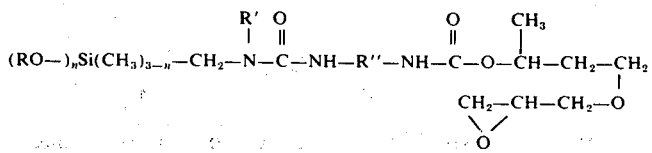

In this formula

R is an alkyl radical having one to four carbon atoms;
R' is a monovalent hydrocarbon radical having up to six carbon atoms, selected from the group consisting of alkyl, cyclohexyl and phenyl;
R'' is a bivalent saturated hydrocarbon radical having two to 10 carbon atoms; and
n is an integer from 1 to 3.

The invention also provides a method for producing these compounds, which method comprises reacting an aminomethylalkoxysilane of the general formula

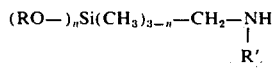

with an epoxy-organo-isocyanate of the general formula

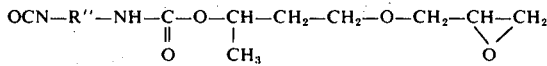

at a temperature below 50°C, and optionally in the presence of one of the catalysts conventionally used for the addition of amines to isocyanates; R, R', R'' and n being as before.

The new products are suitable as priming agents on silicious surfaces, especially glass surfaces, which are to be coated with synthetic resins or elastomers, and also as cross-linking agents in organopolysiloxane compositions which are converted into elastomers at room temperature upon the access of water.

The aminomethyl-alkoxysilanes and epoxy-organo-isocyanates to be used for the preparation of the new compounds are known; the latter compounds, for example, from British Patent Specification No. 1,276,710. As described therein (Examples 1 and 4), the compounds which are used in the following illustrative Examples can be prepared as follows:

I. A mixture of 840 g. hexamethylene diisocyanate and 0.33 g. tin(II)-2-ethyl caproate is heated under reflux, with the exclusion of moisture, to 85° to 90°C; a solution of 73 g. 3-hydroxybutyl-glycidyl ether in 75 cc xylene is added thereto dropwise in the course of 75 minutes while stirring; and stirring is then continued for 30 minutes. The reaction product is then freed from volatile components by treating it three times in a thin layer vacuum evaporator at 0.1 mm Hg and 120°C. The last residue has an epoxide equivalent weight of 317 g. (calculated 314 g.) and contains 12.7 per cent by weight of NCO (calculated 13.4); it substantially corresponds to the formula

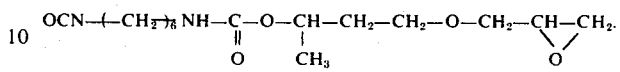

II. In analogy with the method described above, a mixture of 800 g. 1-isocyanato-3-(isocyanatomethyl)-3,5,5-trimethyl cyclohexane of the formula

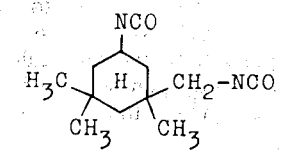

and 0.33 g tin(II)-2-ethyl caproate is reacted with a solution of 90 g. 3-hydroxybutyl-glycidyl ether in 100 cc xylene. The reaction product is stirred for a further 30 minutes, then freed from the volatile components by treating it three times in a thin layer evaporator at 0.1 mm Hg and 120°C. The last residue has an epoxide equivalent weight of 402 g. (calculated 357 g.) and contains 10.5 per cent by weight of NCO (calculated 11.8); it substantially corresponds to the formula

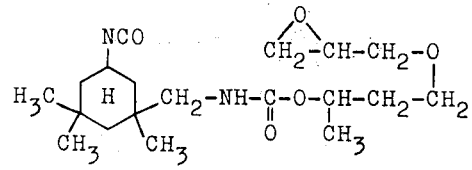

The following Examples are given for the purpose of illustrating the invention.

EXAMPLE 1

To 331 g. of the epoxy-organo-isocyanate described above under I are added 249 g. N-n-butyl-aminomethyl-triethoxysilane of the formula

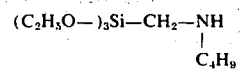

with the exclusion of moisture and with stirring, sufficiently gradually that the temperature can be kept below 25°C by external cooling with ice. Stirring is then continued for ½ hour; the resultant reaction product is a yellowish viscous oil, the epoxide equivalent weight of which amounts to 620 g. (calculated 563 g.) and which contains 23.3 per cent by weight of Si-bound ethoxyl radicals (calculated 23.9); it is rapidly hydrolyzed upon access of moisture and substantially corresponds to the formula

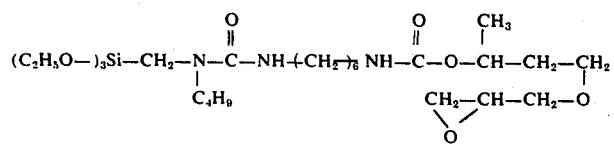

EXAMPLE 2

219 g. methyl-(N-n-butyl-aminomethyl)-diethoxysilane of the formula

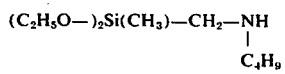

are reacted with 331 g. of the epoxy-organo-isocyanate described above under I, under the same reaction conditions as in the preceding Example. The resultant reaction product is a colorless viscous oil, the epoxide equivalent weight of which amounts to 590 g. (calculated 533 g.) and which contains 16.1 per cent by weight of Si-bound ethoxyl radicals (calculated 16.9); it is rapidly hydrolyzed upon access of moisture and substantially corresponds to the formula

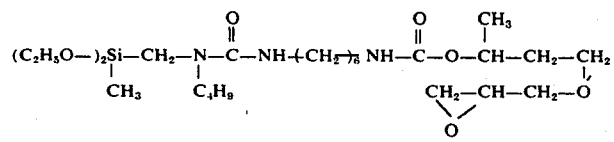

EXAMPLE 3

275 g. N-cyclohexyl-aminomethyl-triethoxysilane of the formula

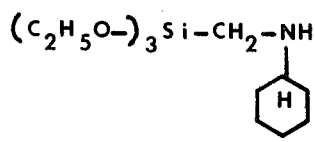

are reacted with 331 g. of the epoxy-organo-isocyanate described above under I, under the same reaction conditions as in the preceding Examples. The resultant reaction product is a pale yellow clear viscous oil, the epoxide equivalent weight of which amounts to 650 g. (calculated 589 g.) and which contains 22.0 per cent by weight of Si-bound ethoxyl radicals (calculated 22.9); it is rapidly hydrolyzed upon the access of moisture and substantially corresponds to the formula

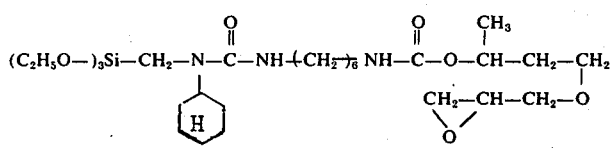

Example 4

117 g. dimethyl-(N-cyclohexyl-aminomethyl)-ethoxysilane of the formula

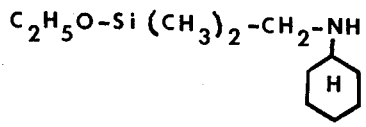

are reacted with 215 g. of the epoxy-organo-isocyanate described above under II, under the same reaction conditions as in the preceding Examples. The resultant reaction product is a pale yellow clear viscous oil, the epoxide equivalent weight of which amounts to 630 g. (calculated 583 g.) and which contains 7.2 per cent by weight Si-bound ethoxyl radicals (calculated 7.75); it substantially corresponds to the formula

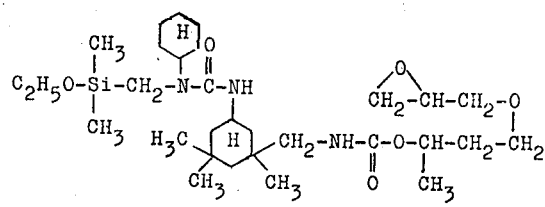

EXAMPLE 5

281 g. methyl-(N-phenyl-aminomethyl)-di-n-butoxy silane of the formula

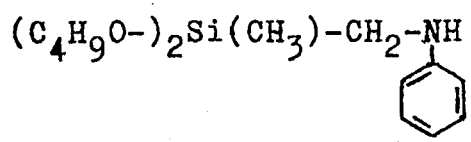

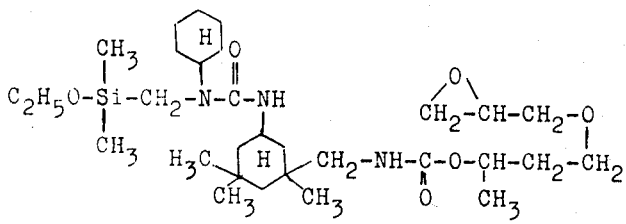

are reacted with 331 g. of the epoxy-organo-isocyanate described above under I, under the same reaction conditions as in the preceding Examples. The resultant reaction product is a pale yellow clear viscous oil, the epoxide equivalent weight of which amounts to 610 g. (calculated 595 g.) and which contains 23.5 per cent by weight of Si-bound n-butoxyl radicals (calculated 24.6); it substantially corresponds to the formula 3. An epoxidized organo-alkoxysilane of the formula:

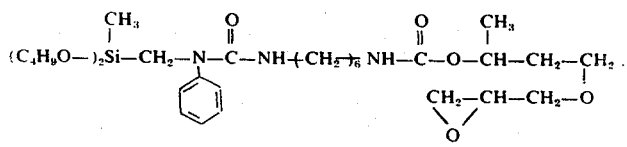

What we claim is:
1. An epoxidized organo-alkoxysilane of the formula:

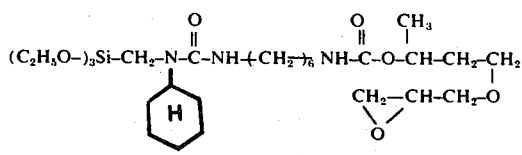

2. An epoxidized organo-alkoxysilane of the formula:

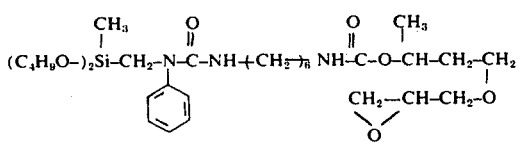

* * * * *